March 2, 1971     J. D. BIRCHALL     3,567,371
SODIUM CHLORIDE CRYSTALS
Filed July 28, 1967
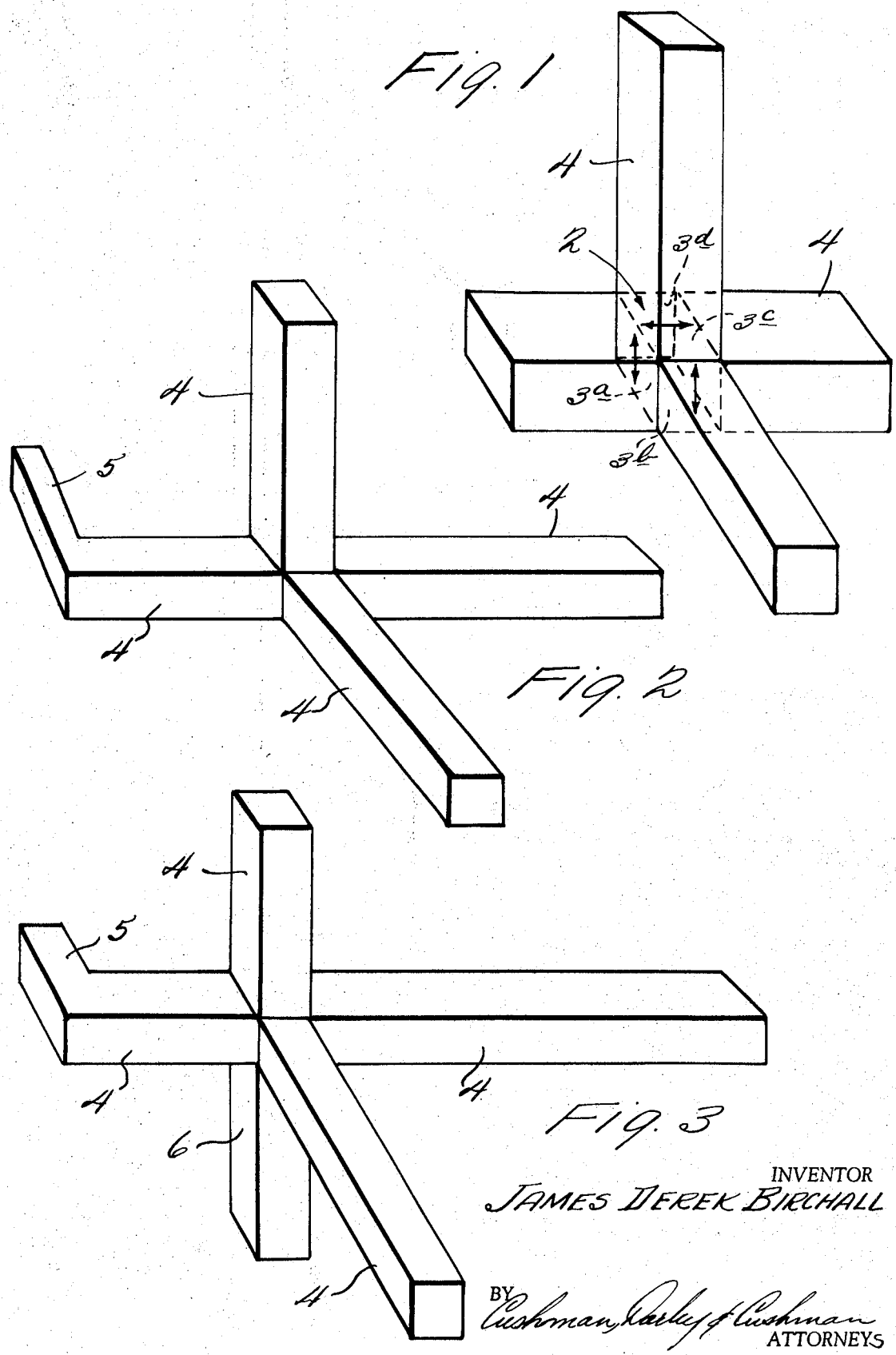
INVENTOR
JAMES DEREK BIRCHALL
BY Cushman, Darby & Cushman
ATTORNEYS

United States Patent Office 3,567,371
Patented Mar. 2, 1971

3,567,371
SODIUM CHLORIDE CRYSTALS
James Derek Birchall, Northwich, England, assignor to Imperial Chemical Industries Limited, London, England
Filed July 28, 1967, Ser. No. 656,678
Claims priority, application Great Britain, Aug. 17, 1966, 36,863/66
Int. Cl. C01d 3/04
U.S. Cl. 23—89                                                4 Claims

ABSTRACT OF THE DISCLOSURE

Preparation of a novel crystal form of sodium chloride by evaporating sodium chloride brines containing certain additives. The novel crystal form comprises a cube having rectilinear columns of rectangular, usually square section attached perpendicularly to at least one pair of adjacent faces of the cubes. To the columns themselves can also be attached, perpendicularly, further rectilinear columns, and so on, and the perpendicular positioning holds the crystals apart from one another in the mass and the bulk-density of such a mass is consequently low. The additives include polyvinyl alcohol either alone or in association with polyelectrolytes that give rise to polyanions, and combinations of a water-soluble polyelectrolyte and salts able to yield inorganic ions that form insoluble or sparingly soluble salts with the polyions of the polyelectrolyte. Particularly effective is 1 to 100 parts by weight per million of brine of poly(vinyl alcohol) of molecular weight such that the viscosity of a 1% by weight aqueous solution at 20° C. is 1.1 to 1.6 centistokes; or a combination of 5 to 50 parts of sodium alginate and 250–500 parts of calcium ions by weight per million of brine.

BACKGROUND OF THE INVENTION (1) Field of the invention

Modification of crystal form of sodium chloride by means of additives.

(2) Description of prior art

USP 2,642,335 discloses the preparation of three-dimensional dendritic crystals of sodium chloride by evaporation of brine containing additives particularly alkali metal ferrocyanides.

SUMMARY OF THE INVENTION

Sodium chloride (common salt) in a novel crystal form comprising a cube having rectilinear columns of rectangular section attached to and perpendicular to at least one pair of its adjacent faces. A process for making said sodium chloride comprising evaporating brine containing less than 500 parts of polyvinyl alcohol per million by weight, or brine containing a water-soluble polyelectrolyte and a salt able to yield inorganic ions that form insoluble or sparingly soluble salts with the polyions of the polyelectrolyte.

This invention relates to sodium chloride, referred to hereinafter sometimes as common salt, and particularly to a process for making a common salt having a novel crystal form and a low bulk density.

It is known to make a common salt in the form of three-dimensional dendritic crystals having a bulk density of 0.70 g./cc. or less by adding to sodium chloride brine undergoing evaporation small amounts of crystal-habit modifiers particularly soluble ferrocyanides. The dendritic crystals produced in this way are small and fragile since the dendritic excrescences, which are attached to the corners of the central sodium chloride cubes with their axes at right angles to the 111, or more rarely the 110 planes, possess low mechanical strength.

For several purposes a common salt in the form of crystals larger and stronger than the dendritic crystals would be desirable and useful. Dendritic crystals somewhat larger than normal can be made, but the larger they are the more fragile they become. In fact the particle size of dendritic crystals of sodium chloride made on a commercial scale in evaporators tends to be self-limiting since larger and more fragile crystals break down within the evaporator owing to mechanical stresses there.

It is the principal object of the present invention to produce a common salt whose crystals are larger than those of normal dendritic salt and stronger, and also possess low bulk density. It has been achieved by finding that the presence of certain additives and combinations of additives in sodium chloride brine undergoing evaporation leads under certain conditions to the production of sodium chloride possessing a novel crystal form, namely cubes to whose faces are attached, perpendicularly, columns of rectangular section. That is to say the axes of the columns are at right angles to the 100 planes. The columns may also have attached to themselves perpendicularly at one or more points along their lengths other columns of rectangular section, and these in their turn may likewise have columns of rectangular section attached perpendicularly, and so on. Since the excresences attached to the central cube are columnar, rather than acicular like dendritic excrescences, they possess greater mechanical strength and can be grown to a greater size in crystallisation equipment, and the crystals suffer less damage in handling and transport. Further, the perpendicular positioning and branching of the columns holds the crystals apart from one another in a mass of crystals, consequently the bulk-density of such a mass is low.

Thus the invention provides crystals of sodium chloride (common salt) whose crystal form comprises a cube having rectilinear columns of rectangular section attached, perpendicularly, to at least one pair of its adjacent faces.

In another embodiment the invention provides crystals of sodium chloride (common salt) whose crystal form comprises a cube having rectilinear columns of rectangular section attached, perpendicularly, to at least one pair of its adjacent faces, said columns having attached to themselves, perpendicularly, at at least one point along their lengths other rectilinear columns of rectangular section, which may in their turn likewise have rectilinear columns of rectangular secton attached perpendicularly, and so on.

The cross-section of the columns can be less than that of a given cube-face, and if so one or more columns can be attached to the same face, or it can be equal to that of the face. The lengths of columns can be less than, equal to or greater than the length of the edge of the cube. The rectangular section of the columns is generally a square section but it may be an oblong section. Generally columns are attached to all six faces of the cube but less frequently some faces, but never more than four, can be devoid of attached columns.

The crystals of the invention are diagrammatically shown in the accompanying FIGS. 1–3. Referring to FIG. 1, the crystal comprises the cube 2 with top and front faces 3d and 3b, and left and right side faces 3a and 3c, respectively. The arrows represent the 100 planes for the faces indicated. The bottom and rear faces of the cube are not identified for the sake of simplicity. According to the invention, rectilinear columns, represented by the numeral 4, of rectangular section are attached to at least one pair of adjacent faces, e.g. faces 3a and 3b and, as shown the axes of these columns are at right angles to the 100 planes of these faces.

FIG. 2 shows the embodiment wherein a rectilinear column is also attached perpendicularly to another rectilinear column 5, as aforesaid. The crystal form of FIG. 3 is similar to that shown in FIG. 2 with an additional rectilinear column 6 attached to the bottom face of the cube.

The additives, which when present in sodium chloride brine undergoing evaporation, modify the normal crystal form of sodium chloride to that of the invention fall into two groups. The first group comprises polyvinyl alcohol either alone or in association with polyelectrolytes that give rise to polyanions; the second group comprises combination of a water-soluble polyelectrolyte and salts able to yield inorganic ions that form insoluble or sparingly soluble salts with the polyions of the polyelectrolyte. Of these various additives and combinations of additives a particularly effective one is poly(vinyl alcohol) preferably having a molecular weight such that the viscosity of a 1% by weight aqueous solution of 20° C. is less than 3.0 centistokes, preferably 1.1 to 1.6 centistokes. The term polyvinyl alcohol is to be understood as including polyvinyl acetate hydrolysed to the extent of at least 75% by weight, preferably 98–100%.

Particularly suitable polyelectrolytes among the second group of additives are those giving rise to polyanions, for example soluble salts of alginic acid, of pectic acid, of carboxymethyl cellulose and of other long-chain organic compounds containing carboxylic acid groups. Inorganic ions able to form insoluble or sparingly soluble salts with such polyanions are cations, for example of calcium, magnesium, aluminium and zinc. A particularly effective combination comprises sodium alginate and calcium chloride which give rise to the insoluble calcium alginate.

Thus another feature of the invention provides a process for making sodium chloride comprising evaporating sodium chloride brine containing polyvinyl alcohol having a molecular weight such that a 1% by weight aqueous solution of the polyvinyl alcohol has a viscosity at 20° C. of less than 3.0 centistokes.

Yet another feature of the invention provides a process for making sodium chloride comprising evaporating sodium chloride brine containing at least one water-soluble polyelectrolyte and at least one salt able to yield inorganic ions that form an insoluble or sparingly soluble salt with the polyions of the polyelectrolyte.

The amount of polyvinyl alcohol required in the brine is small. If the concentration is too high, for example greater than 500 parts per million parts of brine by weight, needle-shaped crystals of little commercial value are formed. A convenient concentration is from 1 to 100 parts by weight of polyvinyl alcohol per million parts by weight of brine. The minimum concentration varies with the molecular weight of the polyvinyl alcohol as illustrated in the table in which the concentration is expressed as parts by weight of polyvinyl alcohol per million parts by weight of brine.

Table

| Viscosity of 1% by weight aqueous solution of polyvinyl alcohol at 20° C. (centistokes): | Minimum concentration of polyvinyl alcohol in brine evaporating at 50° C. |
|---|---|
| 1.10 | 1 |
| 1.23 | 3 |
| 1.46 | 5 |
| 1.55 | 10–20 |
| 1.87 | 20 |
| 1.99 | 20–50 |
| 2.53 | 50–75 |
| 3.00 | 75–100 |

The preferred concentration of polyvinyl alcohol over the preferred range of molecular weights, namely those corresponding to a viscosity range of 1.1 to 1.6 centistokes for a 1% by weight aqueous solution at 20° C., is 5 to 75 parts by weight per million parts by weight of brine.

For the other additives namely the combinations of polyelectrolytes and inorganic ions their concentrations are governed by the preferred requirement that the ratio of the concentration of polymer and inorganic ion is such that the insoluble salt derived from them is formed at the faces of the sodium chloride crystals rather than in the body of the brine. This sets an upper limit to the concentration of the inorganic ion, namely that concentration at and above which the insoluble salt is precipitated in the body of the brine. The lower limit to the concentration of the inorganic ion is that at and below which the insoluble salt is not formed at the crystal faces. Examples of suitable concentrations are from 5 to 50 parts by weight of sodium alginate or sodium pectate or sodium salts of carboxymethyl cellulose, and 250 to 500 parts by weight of calcium ions per million parts by weight of brine. These numerical values for the concentrations are given in order to illustrate the order of magnitude, of the amounts of polyelectrolyte and inorganic ion normally required and are not meant to be taken as fixed upper and lower limits since these depend closely on the particular additives. It does seem however that the upper limit for the concentration of inorganic cations is less than 2000 parts by weight per million parts by weight of brine.

In the examples all parts are by weight.

Example 1.—Brine feeding a continuous evaporator operating at 42° C. and yielding 70 g. per litre per hour of sodium chloride crystals was treated with 50 parts per million of polyvinyl alcohol, obtained by hydrolysing polyvinyl acetate to at least 95%, and having a molecular weight such that the viscosity of a 1% by weight aqeous solution at 20° C. was 1.47 centistokes. The sodium chloride crystals were in the form of central cubes with rectilinear columns of rectangular section attached perpendicularly to all their faces. When dry the crystals had a bulk density of 0.50 g./cc.

Example 2.—Sodium chloride brine containing 500 parts per million of calcium ions (added as calcium chloride) and 10 parts per million of sodium alginate was evaporated at 50° C. with continuous stirring. The sodium chloride crystals produced were in the form of central cubes having rectilinear columns of rectangular section attached perpendicularly to all their faces. The lengths of the columns were from twice to four times those of the cube faces. The average size of the crystals was 750 microns and their bulk density when dry 0.55 g./cc.

What I claim is:

1. Crystal of sodium chloride of less than 0.70 g./cc. whose crystal form comprises a cube having rectilinear columns of rectangular section attached perpendicularly to at least one pair of its adjacent faces whereby the axes of said columns are at right angles to the 100 planes.

2. Crystals of sodium chloride of less than 0.70 g./cc. in which columns are attached to all six faces of the cubes, said crystals having a bulk density of from 0.5 g./cc. to 0.55 g./cc.

3. Crystals of sodium chloride as claimed in claim 1 in which said columns have attached to themselves perpendicularly at at least one point along their lengths other rectilinear columns of rectangular section.

4. Crystals of sodium chloride as claimed in claim 2 in which said columns have attached to themselves perpendicularly at at least one point along their lengths other rectilinear columns of rectangular section.

References Cited

UNITED STATES PATENTS

| | | | |
|---|---|---|---|
| 1,950,459 | 3/1934 | Seifert | 23—303X |
| 2,108,783 | 2/1938 | Smith et al. | 23—89X |
| 2,539,012 | 1/1951 | Diamond et al. | 23—89X |
| 2,642,335 | 6/1953 | May et al. | 23—89 |
| 3,095,281 | 6/1963 | Schinkel | 23—300 |
| 3,148,023 | 9/1964 | Ploss | 23—89 |
| 3,196,024 | 7/1965 | Saunders | 23—89X |
| 3,197,277 | 7/1965 | Cooke | 23—89 |
| 3,378,489 | 4/1968 | Lasater | 23—303X |
| 3,378,493 | 4/1968 | Jacoby et al. | 23—89X |
| 3,240,558 | 3/1966 | Heiss et al. | 23—89 |

EDWARD STERN, Primary Examiner

U.S. Cl. X.R.

23—300, 303